United States Patent
Giordmaine et al.

[11] 3,787,111
[45] Jan. 22, 1974

[54] ELECTROOPTIC GRATING FOR SCANNING A BEAM OF LIGHT

[75] Inventors: Joseph Anthony Giordmaine, Summit; David Allmond Kleinman, Lebanon, both of N.J.

[73] Assignee: Bell Telephone Laboratories, Incorporated, Murray Hill, N.J.

[22] Filed: Apr. 16, 1973

[21] Appl. No.: 351,167

[52] U.S. Cl. ............................ 350/160 R, 178/7.6
[51] Int. Cl. ............................................ H04n 3/14
[58] Field of Search .................. 350/160 R; 178/7.6

[56] References Cited
UNITED STATES PATENTS
3,704,935   12/1972   Boer.............................. 350/160 R Primary Examiner—John K. Corbin
Assistant Examiner—Paul K. Godwin
Attorney, Agent, or Firm—D. I. Caplan

[57] ABSTRACT

An optical grating is provided by an array of multiple stripe electrodes on a single major surface of an electrooptic crystal. Advantageously, in one type of operation (scanning), time-varying linear sawtooth voltage potentials (or electrostatic charges) are applied to each electrode. The rise times of these applied sawtooth voltages (or charges) vary for successive electrodes, such that the phase shift undergone by an optical beam propagating through the crystal perpendicular to the major surface varies substantially linearly with distance along the surface in a direction perpendicular to the stripe electrodes. Thereby, the optical beam is deflected (scanned) through an angle which likewise varies linearly with time. In other types of operation (including analog deflection), signal voltages are applied to sawtooth function generators which supply suitable voltages (or charges) to the electrodes, for deflecting the optical beam in accordance with a desired function of time.

10 Claims, 6 Drawing Figures

ELECTROOPTIC GRATING FOR SCANNING A BEAM OF LIGHT

FIELD OF THE INVENTION

This invention relates to the field of optical control systems, and more particularly to optical grating deflection devices.

BACKGROUND OF THE INVENTION

In U.S. Pat. No. 3,626,511 (issued to J. M. Hammer on Dec. 7, 1971), there is disclosed digital light deflection apparatus utilizing an electrooptic grating. The deflection apparatus disclosed therein is not capable of deflecting a light beam through an angle which is continuously varying in time, but is limited to digital deflections. However, while such apparatus is capable of high-speed operation, nevertheless for many applications in the fields of optical communication and optical memory systems, it is desirable to have continuously varying optical deflection apparatus, in order to provide a continuous scanning of an optical beam.

On the other hand, U.S. Pat. No. 3,625,594 (issued to C. Lanza on June 30, 1969) discloses apparatus for continuous scanning of an optical beam by means of the electrooptic effect in a Gunn effect semiconductor; however, such apparatus is limited to optical beams whose wave-lengths are within narrow range corresponding to photon energies just below the band gap of the semiconductor. In addition, such Gunn effect optical deflectors are not reliable because they suffer from the variability of the threshold voltage for the Gunn effect.

In U.S. Pat. No. 3,517,200 (issued on June 23, 1970 to G. U. Kalman), an electrooptic device is disclosed in which an input beam of light propagates through an array of electrooptic crystals. This input beam is incident upon the crystals and propagates therethrough in a direction which is parallel to a pair of opposed major surfaces, upon both of which electrodes are located. Voltage potentials are set up between the electrodes on the opposed surfaces, in order to produce electrooptic deflection of the input beam. However, such an electrooptic device would require extremely thin individual electrooptic crystals in the array, each crystal having at least one thickness dimension comparable with the wavelength of the light being deflected, thereby rendering the device very difficult to fabricate.

It is a known optical principle that a spatially varying refractive index in a direction transverse to a beam of light will produce a deflection of said beam through an angle $\theta$, by reason of an induced gradient of phase delay $d\Phi/dx$, in accordance with the relation:

$$\theta = \lambda/2\pi (d\Phi/dx). \qquad (1)$$

This deflection results in a more clearly defined (better resolution) output beam direction when the refractive index variation is linear (and hence $d\Phi/dx$ is constant) in such a transverse direction. While this principle was utilized in the apparatus of the above-mentioned prior art, there were several shortcomings in this art, as discussed previously. Accordingly, it would be desirable to devise optical deflection apparatus capable of continuous scanning of optical beams, without the shortcomings of the prior art.

SUMMARY OF THE INVENTION

In accordance with this invention, voltages (or electrostatic charges) are applied to an array of mutually parallel electrode stripes located on a major surface of an electrooptic crystal. Advantageously, the voltages (or charges) are applied to each electrode such that the phase retardation undergone by an optical beam, propagating in the direction perpendicular to the major surface through the electrooptic crystal, varies substantially linearly with distance in the $x$ direction, i.e., along the surface of the crystal perpendicular to the electrode stripes in the array. Thereby, an optical grating is formed which deflects the beam through a predetermined angle. This angle can be varied in time by varying the voltages (or electrical charges) applied to the electrodes. Moreover, these applied voltages (or electrical charges) can be kept relatively low by controlling the magnitudes of the changes in electrooptic phase retardations in a range confined to between 0 and $2\pi$. Applied voltages (or charges) which are confined to this range will then have an overall linear sawtooth variation from electrode to electrode (i.e., neglecting local small scale variations over an individual electrode) at any instant of time; that is to say, for example, the electrode voltages plotted against distance $x$ will form a linear sawtooth as a smoothed-over type of curve.

In a specific embodiment of the invention, a transmission type optical deflection device is provided by a thin electrooptic crystal plate, such as strontium barium niobate, with an array of mutually parallel electrode stripes on a major surface thereof. The crystal plate is advantageously cut such that one of its crystallographic axes is aligned parallel to the electrode stripes and another of the crystallographic axes is aligned perpendicular to the electrode stripes. The third crystallographic axis of the crystal will then be aligned perpendicular to the major surface of the plate. Optical radiation to be deflected is incident normally upon the plate while time-varying sawtooth voltages are applied to the array of electrodes. Each of these applied voltages advantageously varies as a linear sawtooth with differing sawtooth frequencies, in order to produce a linearly varying deflection as a function of time. By properly selecting the various sawtooth frequencies and relative sawtooth phases, as described in greater detail below, a linear variation in phase retardation can be impressed upon the input optical radiation as it propagates normal to the plate. Thereby, the incident beam is deflected through an angle which varies substantially linearly in time (i.e., linear scan), as a result of either refraction or diffraction (or both) effects produced in the electrooptic crystal by reason of the electrooptic interaction of the electric fields (produced by the voltages applied to the electrodes) with the optical radiation propagating through the electrooptic plate.

Instead of the above-described voltage controlled mode of operation in which the voltages applied to the electrodes are controlled, the electrostatic charge applied to the electrodes can be controlled in a preferably linear sawtooth relationship with time, thereby also producing electrical fields in the electrooptic crystal for electrooptic interaction with the incident optical beam to be deflected. Specifically, the sum of the charge on any given electrode plus on all electrodes located on one of its sides should have a linear sawtooth variation, characterized by a suitable sawtooth frequency and phase depending upon the location of the given electrode.

In the aforementioned voltage controlled mode of operation, it is the electrical field component (produced by the charged electrodes) which is perpendicular to the major surface of the plate which produces the desired electrooptic interaction; whereas, in the aforementioned charge controlled mode of operation, it is the electrical field component which is transverse to the electrode stripe direction (and parallel to the major surface of the plate) which produces the deflection.

This invention, together with its features, advantages and objects can be better understood from the following detailed description when read in conjunction with the drawing, in which.

For the sake of clarity only, none of the Figures is drawn to scale.

Figure 1:
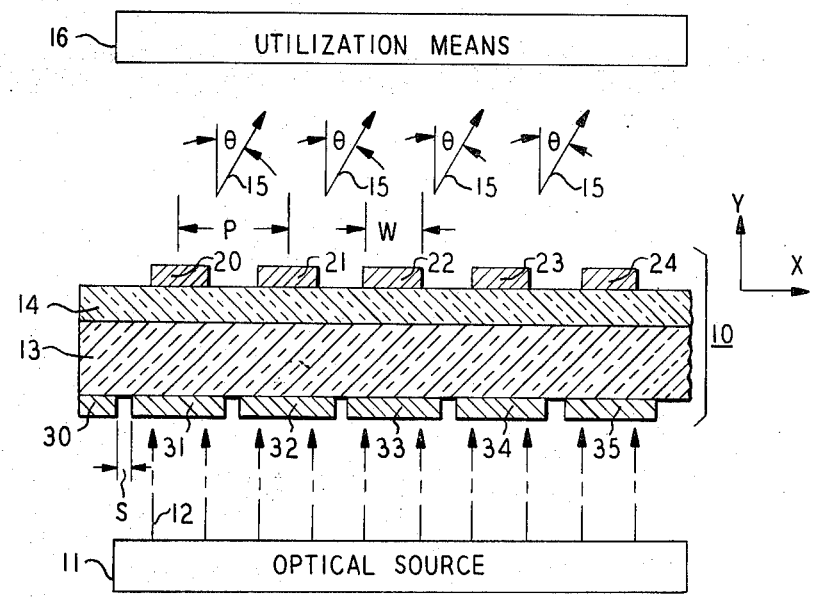
FIG. 1 shows a side view diagram, partly in cross section, of optical deflection apparatus according to the invention.
Figure 2:
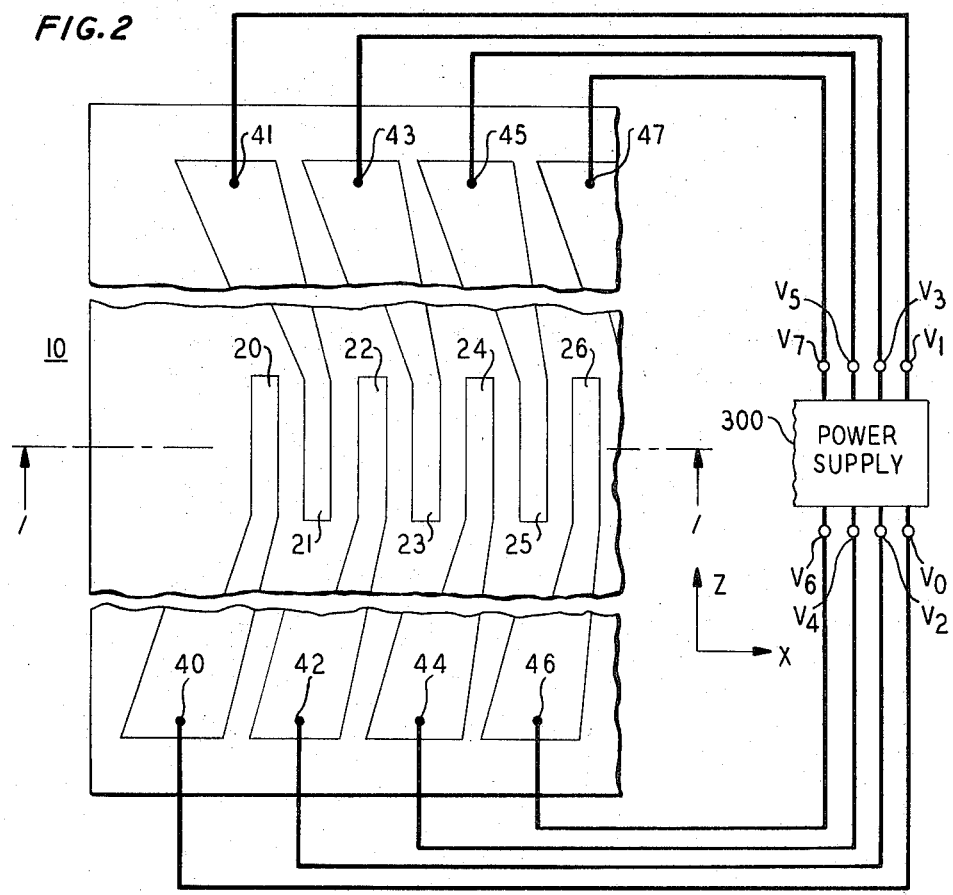
FIG. 2 shows a top view of the apparatus shown in FIG. 1.

FIGS. 1 and 2 show different views of an electrooptical grating deflection apparatus in accordance with the invention. An integrated optical deflection device 10 includes a continuous electrooptic plate 14, typically strontium barrium niobate, which is located on a transparent substrate 13. One of the major surfaces, XZ, of the plate 14 is coated with an array of rectangular electrode stripes 20, 21, 22, 23, 24, etc. An array of rectangular stripe optical stops 30, 31, 32, etc., having aperture widths S and oriented parallel to the electrodes, can also be added to the integrated optical deflection device 10. An optical source 11, advantageously supplying monochromatic light, provides an input optical beam 12 to be deflected by the device 10. Advantageously this beam 12 is incident in the y direction onto the plate 14. Utilization means 16 collect and utilize the wave energy in the resulting output deflected beam 15.

FIG. 2 shows a top view of the device 10 together with suitable electric access circuitry. The electrodes 20, 21, 22, 23, 24, etc., are typically formed on the electrooptic layer 14 by means of conventional photolithographic techniques. These electrodes advantageously fan out to the terminals 40, 41, 42, 43, 44, etc., as indicated in FIG. 2, in order to provide electrical access for the application of voltages thereto by means of an external electrical power supply 300. This power supply provides control voltages $V_0$, $V_1$, $V_2$, $V_3$, $V_4$, etc. (or electrical charges) supplied to the electrodes 20, 21, 22, etc. By suitable control over these voltages applied to these electrodes, the angle of deflection $\theta$ can be correspondingly controlled to provide an output deflected optical beam 15 for utilization means 16. It should be understood that by reason of the electrical capacitance of the electrodes, the electrostatic charge on each electrode can be controlled by the applied electricity from the power supply 300.

As discussed more fully in detail below, in connection with the operation of the apparatus shown in FIGS. 3 and 5, the spatial periodicity P of the electrode array, as well as the width W of the electrodes themselves and the spaces S between neighboring stops (i.e., aperture slit widths), are all selected to direct the output beam 15 at a suitable angle of deflection $\theta$. Depending upon the mode of operation as described below, i.e., the "Voltage Controlled Mode" or the "Charge Controlled Mode," the voltages or charges applied to the electrodes are controlled directly by the electrical power supply 300. As known in the art, this power supply 300 can advantageously be incorporated by integrated circuitry techniques with the device 10, thereby eliminating the need for elongated access wire leads.

VOLTAGE CONTROLLED MODE

Figure 3:
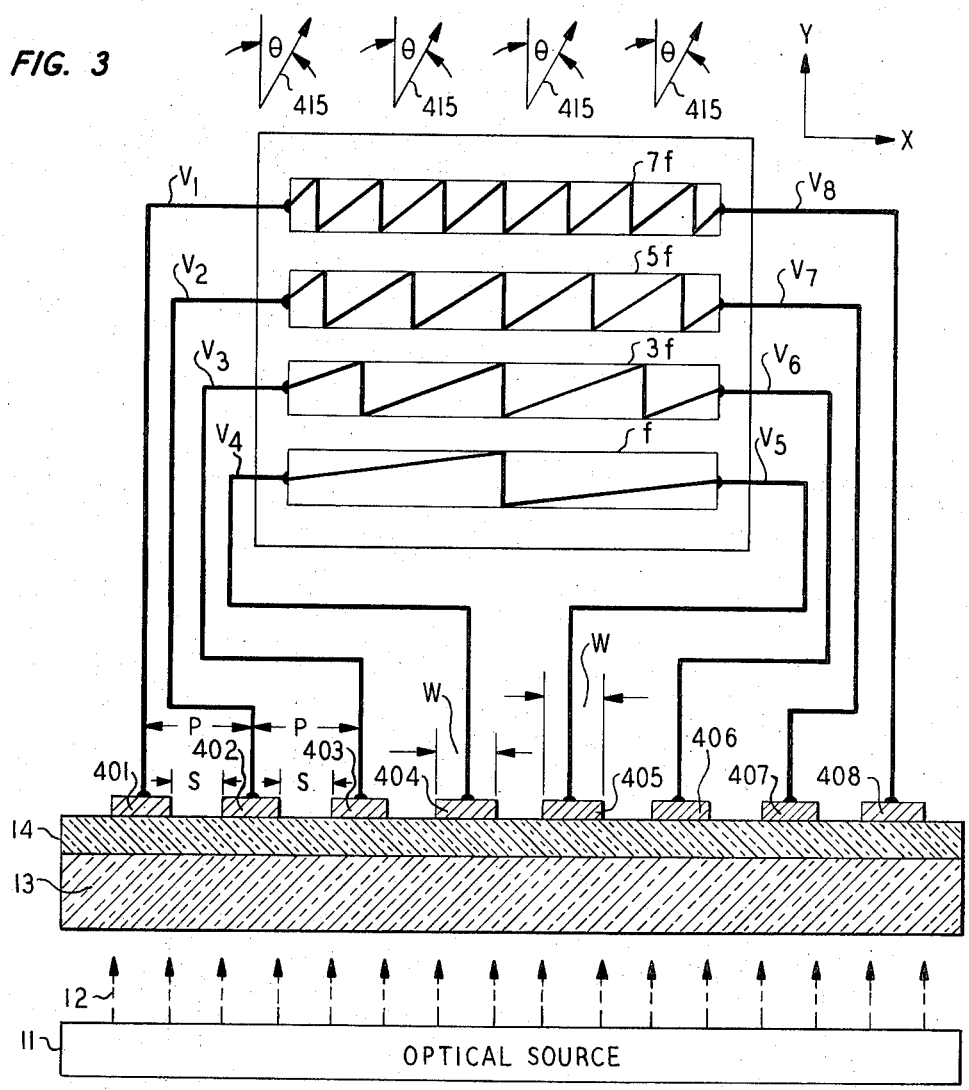
FIG. 3 is a side view diagram, partly in cross section, of optical deflection apparatus operating in the voltage controlled mode, according to a specific embodiment of the invention.

As shown in FIG. 3, an array of eight (for purpose of illustration, only) electrode stripes 401, 402 ... 408 are located on the top surface of electrooptic layer 14. Advantageously, linear sawtooth voltages $V_1$, $V_2$, ... $V_8$, respectively, are applied to these electrode stripes 401, 402, ... 408. Specifically, across the outermost electrodes 401 and 408 the equal but opposite sawtooth voltages $V_1$ and $V_8$ ($=-V_1$), respectively, are applied. Likewise, the sawtooth voltages $V_2$, $V_3$ and $V_4$ are applied to the electrode strips 402, 403 and 404, respectively, and the sawtooth voltages $V_7 = -V_2$, $V_6 = -V_3$ and $V_5 = -V_4$ are applied, respectively, to the electrodes 407, 406 and 405. In addition, advantageously all of the voltages $V_1$, $V_2$, $V_3$, ... $V_8$ have mutually equal magnitude of sawtooth voltage height; however, the frequency ($7f$) of the voltage $V_1$ is seven times the frequency ($f$) of $V_4$; the frequency ($5f$) of the voltage $V_2$ is five times the frequency ($f$) of $V_4$, and the frequency ($3f$) of the voltage $V_3$ is three times the frequency ($f$) of $V_4$. Summarizing:

At frequency $f$: $V_4 = -V_5$ ;

$3f$: $V_3 = -V_6$ ;
$5f$: $V_2 = -V_7$ ;
$7f$: $V_1 = -V_8$ .

The magnitude of the (equal) sawtooth voltage heights of all of the voltages $V_1$, $V_2$, $V_3$, ... $V_8$ is selected such that the optical phase delay undergone by radiation traversing the crystal 14 through any electrode is changed by $2\pi$ at the moment of time when the sawtooth voltage abruptly changes polarity. Thereby, a smooth continuous deflection of the output beam 15 can be afforded; whereas the voltage magnitudes applied to all the electrodes are kept relatively small, namely at most equal to the voltage change required only for a change in phase shift of $\pm\pi$ (rather than $\pm 3\pi$ phase shift for the case of eight electrodes, as would be required in the absence of the sawtooth frequencies $3f$, $5f$, $7f$). The deflection of the output beam 415 will be a repetitive linear scan which repeats with a frequency of $2f$.

While the drawing in FIG. 3 indicates only eight electrodes, as indicated above, this is for purposes of illustration only. It should be obvious that, in order to obtain better resolution, many more than eight such electrodes should be used. The sawtooth voltage frequencies of the $n$th electrode in an array of such N electrodes are advantageously made proportional to the magnitude of: $n-(N+1)/2$; whereas the constant of proportionality fixing these frequencies is to be selected in accordance with the desired scanning frequency of the output beam 415.

In order to calculate the sawtooth voltage heights required for $\pm\pi$ change in phase shift, it should be remembered that the crystal plate 14 is to be set with its (1, 2, 3) crystallographic axes, defined by its diagonalized dielectric constant tensor, oriented parallel to any one of the six possible permutations of the XYZ axes defined by the electrode stripes and by the major surface of the plate itself. The relevant component of electric field E (for producing voltage controlled electrooptic deflection), set up in the crystal by the voltages applied to the electrode stripes, is the Y component, $E_y$. There are two possible polarizations in the optical input beam 12, namely the X or the Z polarization directions, i.e., perpendicular ($\perp$) or parallel ($\parallel$) to the electrode stripes. In terms of the nine conventional electrooptic coefficients $r_{11}$, $r_{12}$, $r_{13}$, $r_{21}$, ...$r_{33}$, etc., the following TABLE I indicates the relevant coefficients for the two optical polarizations.

TABLE I

| X | Y | Z | ($\perp$) | ($\parallel$) |
|---|---|---|---|---|
| 1 | 2 | 3 | $r_{12}$ | $r_{32}$ |
| 1 | 3 | 2 | $r_{13}$ | $r_{23}$ |
| 2 | 3 | 1 | $r_{23}$ | $r_{13}$ |
| 2 | 1 | 3 | $r_{21}$ | $r_{31}$ |
| 3 | 1 | 2 | $r_{31}$ | $r_{21}$ |
| 3 | 2 | 1 | $r_{32}$ | $r_{12}$ |

The other nine coefficients $r_{14}$ ... $r_{36}$ are not relevant to the operation of the device.

The magnitude of the change in phase delay $\Phi$ undergone by the optical beam propagating through the crystal plate 14 (due to the electric field component $E_y$) is given by:

$$\Phi = (\pi/\lambda)rVn^3.$$

(2)

In equation (2) V is the voltage, applied to the electrodes, which produces the Y component of the electric field; and $\lambda$ is the vacuum optical wavelength, $n$ is the refraction index, and $r$ is the relevant electrooptic coefficient as obtained from the above TABLE I. Remembering that $\Phi$ should be equal to $\pi$ at the peak of the sawtooth voltage (i.e., peak sawtooth voltage), equation (1) yields for the peak voltage $V_m$;

$$V_m = \lambda/n^3 r .$$

(3)

Thus, knowing the wavelength $\lambda$, the refractive index $n$, and the relevant electrooptic coefficient $r$ (TABLE I), the voltage $V_m$ at the peak of the sawtooth can be calculated from equation (3).

Figure 4:
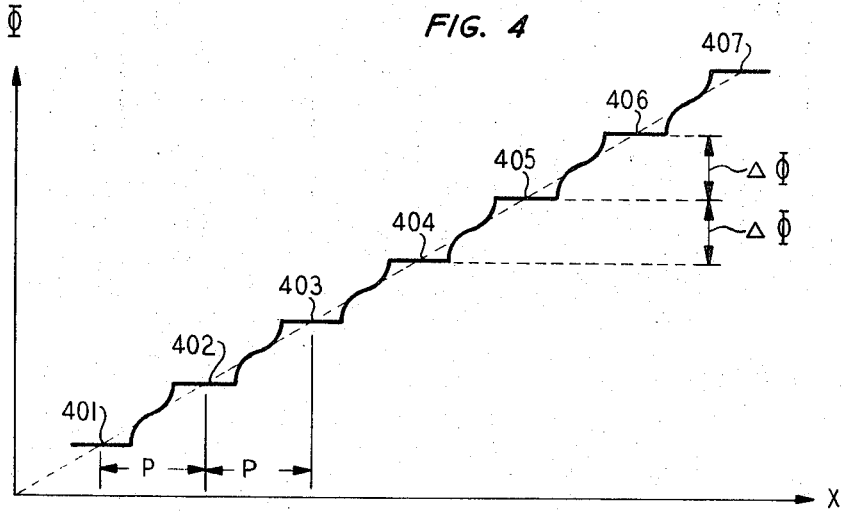
FIG. 4 is a plot of incremental optical phase retardation versus distance, useful in describing the operation of the apparatus shown in FIG. 3.

As indicated in FIG. 4, the phase delay (modulo $2\pi$), caused by the applied voltages, is plotted as a function of distance $x$ along the crystal 14 (perpendicular to the electrode stripes). It should be noted that the phase retardation $\Phi$ is constant throughout each electrode. By utilizing the output of optical radiation transmitted solely through (and not between) the electrodes 401, 402, etc., this output radiation is formed by the superposition of a group optical wave having equal differences (modulo $2\pi$) in phase $\Delta\Phi$. By well-known optical principles, the diffracted output has a deflection angle $\theta$. This angle of deflection $\theta$ (in nth order diffraction) will be given by (see equation (1)):

$$\theta = (\lambda/2\pi)(\Delta\Phi/P) + \theta_n$$

(4)

(where $\theta_n$ is the deflection angle of the $n$th order diffraction in the absence of applied voltages) since P is the spatial periodicity of the electrode stripes and $\Delta\Phi$ is the phase difference in optical radiation propagating through successive stripes.

The angle $\theta$, given by equation (4), is attributable to an optical diffraction effect. On the other hand, the optical radiation transmitted between the electrodes is characterized by a substantially linear variation with distance over a large fraction of the electrodes, typically over 60 percent. See: FIG. 4. Thus, in turn, $(d\Phi/dx)$ is substantially uniform over a large fraction of this region between electrodes. Therefore, for this output optical radiation, the refraction effect also occurs, and this radiation is most intense for the deflections approximating the angle $\theta$ given by equation (1) above. It should be noted that if this angle $\theta$ of refraction is equal to the angle $\theta$ of diffraction (equation (4)), then a maximum use can be made of the crystal 14 in combination with transparent electrodes, since then both refraction and diffraction of optical radiation can aid each other in the same direction of deflection $\theta$. In order to achieve this mutual aiding of refraction and diffraction, the ratio W/P is advantageously approximately 0.4, although a range of 0.3 to 0.5 is useful for this purpose.

CHARGE CONTROLLED MODE

In this mode, the electrostatic charge produced by the voltages applied to the electrodes controls the deflection. As shown in FIG. 5, apparatus is indicated for producing a deflection angle $\theta$ which varies linearly in time. This deflection is accomplished by means of the mutually equal constant current sources of current I in combination with electrical charge shifters (current pulsers) $Q_1$, $Q_2$, $Q_3$. The charge shifter $Q_1$ periodically shifts a charge equal to Q (per unit length of electrode) from electrodes 504 and 505 to electrodes 503 and 506, by delivering current pulse at a fundamental frequency $f$. This frequency $f$ is selected as desired for the desired time rate of optical deflection angle $\theta$. Each current pulse associated with each charge shifter is related to the current I, in that the charge Q which is contained in each current pulse satisfies $$Qf = I.$$

(5)

Figure 6:
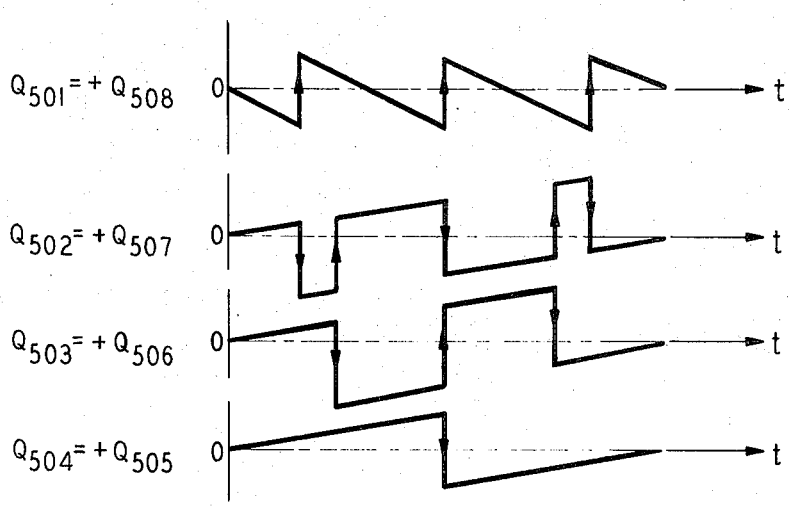
FIG. 6 is a group of curves showing the charge versus time applied to the electrodes which is useful in describing the mode of operation of the apparatus shown in FIG. 5.

Likewise, the charge shifter $Q_2$ shifts an equal amount of charge Q as does $Q_1$, but from electrodes 503 and 506 to electrodes 502 and 507, and at a frequency 2f. The charge shifter $Q_3$ also shifts an equal charge Q, but between the outermost electrodes at frequency 3f. The charges Q501,...Q508 on the electrodes 501,...508, respectively, are plotted as a function of time in FIG. 6. It should be noted that the charge on each electrode varies in time as a piecewise linear sawtooth and that the sum of all charges on all electrodes is zero at all times as required by electrical neutrality. A definite phase must be maintained between the charge shifters such that every third pulse of $Q_3$ is simultaneous with a pulse of $Q_1$, and every pulse of $Q_1$ is halfway in time between every other two successive pulses of $Q_2$. In this way, the sum of all charges on all electrodes located on the left-hand side of a point X varies in linear sawtooth fashion with the number of electrodes located on the left-hand side of $x$ (disregarding small-scale variations over an individual electrode), and hence sawtooth linearly with $x$.

The amount of charge Q to be shifted (by the charge shifters $Q_1$, $Q_2$ and $Q_3$) per unit length of electrode stripes is obtained from the following considerations. The crystal plate 14 is set with its crystallographic axes oriented parallel to the XYZ axes, as mentioned above in connection with the Voltage Controlled Mode. In this Charge Controlled Mode, however, the relevant component of the electric field E in the crystal is now the X component $E_x$. TABLE II indicates the relevant electrooptic coefficient for the perpendicular ($\perp$) and parallel ($\parallel$) optical polarizations in the Charge Controlled Mode.

TABLE II

| X | Y | Z | ($\perp$) | ($\parallel$) |
|---|---|---|---|---|
| 1 | 2 | 3 | $r_{11}$ | $r_{31}$ |
| 1 | 3 | 2 | $r_{11}$ | $r_{21}$ |
| 2 | 3 | 1 | $r_{22}$ | $r_{12}$ |
| 2 | 1 | 3 | $r_{22}$ | $r_{32}$ |
| 3 | 1 | 2 | $r_{33}$ | $r_{23}$ |
| 3 | 2 | 1 | $r_{33}$ | $r_{13}$ |

Furthermore, the magnitude of the change of phase delay $\Phi$ at $x$ suffered by the optical beam propagating through the crystal plate due to the electric field component $E_x$ is given by:

$$\Phi = 4\pi^2 r n^3 / \lambda \epsilon_x (\Sigma Q)$$

(6)

where ($\Sigma Q$) is the sum of all charge on the electrodes situated on the left-hand side of $x$, and $\epsilon_x$ is the dielectric constant of the electrooptic crystal 14 for the electric field component $E_x$. Thus, remembering that the phase $\Phi$ should be shifted by $2\pi$ at the occurrence of each charge shift Q, and that two electrodes are serviced by each charge shifter, it therefore follows from equation (6) that $$Q = \lambda \epsilon_x / \pi n^3 r.$$

(7)

Thereby, the desired value of Q can now be calculated from the relevant electrooptic coefficient in TABLE II.

Figure 5:
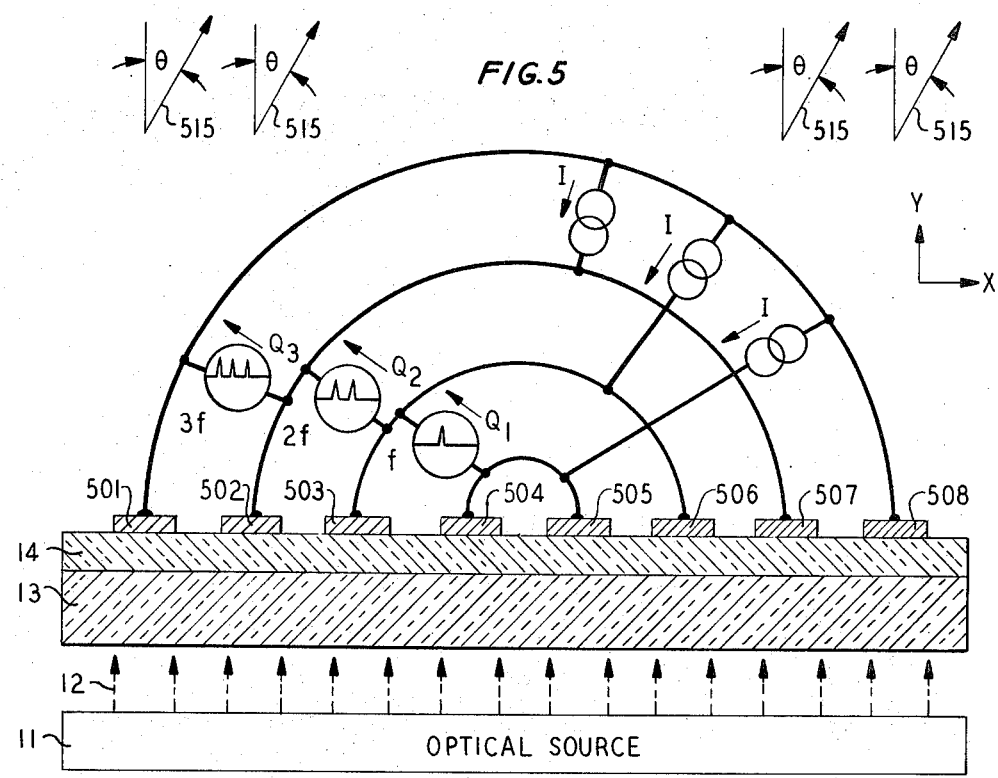
FIG. 5 is a side view diagram, partly in cross section, of optical deflection apparatus in the charge controlled mode, according to another specific embodiment of the invention.

It should now be obvious that the embodiment shown in FIG. 5 can easily be generalized with many more than eight electrodes in number, in combination with further current sources and charge shifters. Again, as in the case of the Voltage Controlled Mode, both refraction and diffraction phenomena can be utilized, to wit, the diffraction of the light propagating between the electrodes or the refraction and diffraction of the light propagating through the (transparent) electrodes, or both effects simultaneously.

While this invention has been described in terms of particular embodiments, various modifications can be made by the worker of ordinary skill in the art without departing from the scope of the invention. For example, many other electrooptic materials can be used for the crystal 14, provided they possess suitably large values of the relevant electrooptic coefficient r (in accordance with TABLES I or II). It should be understood, moreover, that the variations of applied voltages or electrical charges need not be linear in time, but that any suitable time variation of these quantities can be utilized in accordance with any desired time variation in the resulting optical deflection angle. Furthermore, the sawtooth variations of voltages (or charges) can be linear sawtooth variations as functions of parameters other than time, such as are produced by linear sawtooth transducers in response to input signals. In such cases, the linear sawtooths shown in FIGS. 3 and 6 will still be applicable provided the abscissas are then representative of the signal voltage rather than the time. Thereby, analog optical beam deflection can be afforded by the device of this invention.

While the beam of light has been described as propagating perpendicular to the major surface of the electrooptic crystal plate, it is also possible to operate this invention with the beam having a significant propagation component in the direction perpendicular to said major surface. Moreover, the electrooptic plate need not necessarily have optically plane surfaces, but should have a pair of substantially optically true (optical quality) surfaces through which the optical radiation enters and exits. Finally mirrors or reflecting electrodes may be utilized in conjunction with the deflection devices of this invention, to form reflection type deflection gratings, as should be obvious to the worker in the art in view of the above disclosure.

What is claimed is:

1. a device for the deflection of an optical beam which comprises
   a. a layer of electrooptic material transparent to said beam and having a pair of substantially optically true major surfaces;
   b. an array of electrodes on one of said major surfaces, the other of said major surfaces being free of any electrodes to which voltages are to be applied; and
   c. an array of terminals to the array of electrodes, for the application of electricity to the electrodes, the electrodes in the array having a spatial periodicity suitable for the deflection of the optical beam incident upon the layer in a direction having a significant propagation component perpendicular to at least one of said major surfaces, the deflection being in response to electricity applied to the electrodes.

2. The device recited in claim 1 which further includes means for providing and directing the optical beam.

3. The device in claim 1 which further includes means for applying the electricity as control voltages to the terminals of the electrodes.

4. The device recited in claim 3 in which the voltages applied to the electrodes vary in time in accordance with a linear sawtooth functional relationship.

5. The device recited in claim 1 in which the spatial periodicity is of the order of magnitude of the wavelength of the optical beam.

6. The device recited in claim 5 which further includes means for applying the electricity as linear sawtooth voltages as functions of time to the electrodes.

7. The device recited in claim 6 in which the frequency of the sawtooth voltages is different for neighboring electrodes.

8. The device recited in claim 5 which further includes means for applying the electricity as voltages to the electrodes, said voltages varying as linear sawtooth functions of a control signal.

9. The device recited in claim 5 which further includes means for applying the electricity to the electrodes such that the electrostatic charge on each of the electrodes varies as a piecewise linear sawtooth in time.

10. The device recited in claim 5 which further includes means for applying the electricity to the electrodes such that the electrostatic charges on the electrodes vary as piecewise linear sawtooth functions of a control signal.

* * * * *